United States Patent [19]

Carnahan et al.

[11] Patent Number: 5,704,729
[45] Date of Patent: Jan. 6, 1998

[54] CAM LOCKING TYPE SLIDING AND SWIVELING DEVICE

[76] Inventors: Garnett Carnahan; Caroline Carnahan, both of Rte. 3, Box 18, Nixa, Mo. 65714

[21] Appl. No.: 567,705

[22] Filed: Dec. 5, 1995

[30] Foreign Application Priority Data

Aug. 29, 1995 [CN] China .................. 95 2 44619.7

[51] Int. Cl.$^6$ ............................... F16B 21/00
[52] U.S. Cl. .................... 403/322; 403/59; 248/425; 248/429; 297/344.24
[58] Field of Search ............... 403/104, 106, 403/107, 108, 110, 321, 322, 59, 109, 60–61; 248/429, 425; 297/344.24, 344.22, 344.1

[56] References Cited

U.S. PATENT DOCUMENTS

| | | | |
|---|---|---|---|
| 3,445,143 | 5/1969 | Swenson | 248/429 X |
| 3,659,895 | 5/1972 | Dresden | 297/344.22 X |
| 3,821,825 | 7/1974 | Bailey | 297/344.24 X |
| 3,860,283 | 1/1975 | Colautti | 297/344.22 X |
| 3,926,396 | 12/1975 | Hall et al. | 297/344.22 X |
| 4,241,893 | 12/1980 | Koutsky et al. | 248/425 |
| 4,570,997 | 2/1986 | Tanizaki et al. | 248/429 X |
| 5,161,765 | 11/1992 | Wilson | 297/344.24 |

FOREIGN PATENT DOCUMENTS 5914532 1/1984 Japan ............... 297/344.24

OTHER PUBLICATIONS

The Springfield Marine Company 1995 Marine Products Catalog, Nixa, Missouri (Jul. 1994 public availability).
The Springfield Marine Company 1996 Marine Products Catalog, Nixa, Missouri (Date not indicated).

*Primary Examiner*—Harry C. Kim
*Attorney, Agent, or Firm*—Beveridge, DeGrandi, Weilacher & Young, LLP

[57] ABSTRACT

A sliding and swiveling device that includes a sliding plate having a surface for supporting an attachment unit such as a chair and two laterally spaced sliding portions. The device further includes a holder which has a pair of laterally spaced sliding sections that are in a sliding relationship with respect to the two sliding portions of the sliding plate. The holder also includes a sleeve portion which is dimensioned for receiving a sleeve member in a swivel relationship. The device also features a first locking assembly for releasably locking the sliding plate and holder against rotation with respect to the sleeve member. A second locking assembly is provided for releasably locking the sliding plate and holder against longitudinal sliding. The device features a handle member and an assembly for triggering a release of the first locking assembly upon adjustment of the handle member in a first direction (e.g., clockwise) and for triggering a release of the second locking assembly upon adjustment of the same handle member in a second direction (e.g., counterclockwise). Biasing devices are provided to place the two locking assemblies in a locking state when the handle member is not rotated in one direction or the other. The invention also includes a method for manufacturing a sliding and swiveling device.

30 Claims, 7 Drawing Sheets

CAM LOCKING TYPE SLIDING AND SWIVELING DEVICE

BACKGROUND OF THE INVENTION

1. Field of the Invention

The present invention relates to a sliding and swiveling device for use with items such as a table, a chair, an instrument or other apparatus. More particularly, the invention relates to a cam type sliding and swiveling device which includes a swivel locking member, a push plate for longitudinally locking the sliding device and a cam plate with handle for releasing the push plate when rotated in a first direction and releasing a swivel locking member when rotated in an opposite direction thereby providing reliable locking and unlocking action for a table, chair or other item.

2. Background Discussion

In the prior art, conventional sliding and swiveling devices that are used for locking in position a table, chair, instrument or other apparatus are usually composed of a combination of a sliding device and a swiveling device which are separate from each other and operate independently from each other. Usually, the sliding device consists of a supporting holder fixed on the frame of the table or chair, with a column provided on this supporting holder, a sliding plate slidably mounted on the supporting holder, a locking plate rotatably disposed at both sides of the sliding plate. The sliding plate includes a row of uniformly distributed small holes provided along its lengthwise direction. A handle is fixed at one side of the locking plate and extends outward therefrom. Under the fixing or locking mode of the device, the sliding plate stops at a certain position relative to the supporting holder column, such that one of the small holes is aligned with the column. When the sliding plate is required to be moved, the handle joined with the locking plate must be raised to swivel the locking plate to a certain angle and to disengage the locking plate from the small hole formed in the sliding plate and from the column. Then, the sliding plate can be moved. When the sliding plate has been moved to a required position and is to be fixed in position at that new position, the handle is put down, the locking plate is then swiveled in an opposite direction as when the handle was being lifted, and another small hole formed in the sliding plate is aligned for insertion into position with the supporting holder column to achieve a locking action once again.

The swiveling device consists of two components able to swivel relative to each other, several rolling balls fitted between the swiveling surfaces of the swiveling components and a handle as well as numerous other components. One of the swiveling components of this kind of device is usually provided with a series of circumferential or circular surface features while the other corresponding swiveling component of the supporting holder is provided with evenly distributed splines or tooth spacings. The handle is rotatably mounted for up and down movement on the supporting holder. Thus it is possible to position the head portion of the handle so as to be oppositely disposed with the spline or tooth spacings, and, when lifting or lowering the handle, the head portion of the handle is either separated from the splines or tooth spacings or inserted into splines or tooth spacings for the relative swiveling and locking of the swivel components.

It can be seen from the above discussion that this type of sliding and swiveling device has rational structure, reliable performance and smooth operation. However, the sliding and swiveling of the device requires separate handles to operate and the operating action is not continuous; hence, the prior art arrangement is slow in changeover speed and poor in convenience. Besides, the device is numerous in components and relatively complicated to manufacture.

SUMMARY OF THE INVENTION

The present invention is directed at providing a cam locking type sliding and swiveling device which makes use of reliable and fast action cam activated locking plate movement to achieve a reliable locking and release action for tables, chairs and other devices.

A preferred embodiment of the invention features a cam locking type sliding and swiveling device comprising a sliding plate, a sliding plate holder, and a fixed holder sleeve. The sliding plate, when it is in a position to receive the sliding plate holder below it, is provided respectively with a pair of side-by-side convex edge portions which extend lengthwise between opposite ends of the plate. Each of the two convex edge portions has a sliding slot which provides support along an upper surface of a lower section of the convex edge portions and extends between the two opposing ends of the plate.

Between the two convex edge portions, the undersurface of the sliding plate includes a salient member that extends lengthwise in parallel fashion with the convex edge portions from one end of the sliding plate to the other. The salient member includes a first and a second salient portion with each portion having a lengthwise reception slot formed therein. The salient portions include their own exterior curved wall and share an intermediate wall with oppositely curving upper segments. The walls together define the circular reception slots which slots open out at a lower edge of the defining walls. A hook reception member is also provided on the undersurface of the sliding plate to one side of the salient member and near one of the ends of the sliding plate.

The sliding plate holder includes a holder plate portion slidably inserted into the two sliding slots defined by the convex side edges of the sliding plate and a sleeve portion which is rotatably fitted over (or within) a free end of the fixed holder sleeve. On the upper peripheral wall of the sleeve portion there are provided two radially opposite supporting holes (or a hole and a slot), on the top surface.

There is also provided, on an upper end of the sleeve portion, an inwardly extending, preferably horizontally oriented ring surface which extends radially inward from the inner surface of the sleeve portion preferably only over a portion of the opening defined at the upper end of the sleeve portion so that the inwardly extending ring surface partially covers an open end of the sleeve portion.

A single locking tooth or a plurality of locking teeth is/are supported on an upper surface of the horizontally extending ring surface. The tooth or teeth is/are located on a line extending perpendicular to a center line extending through the two radially opposite holes (or a diametrical line extending between two slots or a hole and slot). A supporting shaft extends through and is releasably fixed with respect to the two radially oppositely disposed supporting holes or slots formed in the sleeve portion. The supporting holes or slots are arranged so that the shaft is positioned above the upper surface of horizontally extending ring surface while each locking tooth supported on the horizontally extending ring surface extends above the upper surface of the shaft.

A thrust plate or locking block is provided on the shaft and is comprised of a base portion having a front tooth-like projection, an intermediate cam receipt recess, and a rear abutment projection. The base portion also includes a transverse through-hole near its intermediate vertical position that extends through both the tooth-like projection and the base portion. The locking block also includes a locking thrust portion having an intermediate convex portion at its upper side extending off from the base portion and a locking tongue portion extending forwardly off from and below the intermediate convex portion at the lower front side of the front through hole. Said locking block is fitted on the supporting shaft through the transverse through hole in its base and its front locking tongue portion is made to be oppositely disposed with an axial wall hole or slot formed in the fixed holder sleeve which fixed holder sleeve preferably extends internally within the sleeve portion.

A coil spring is fitted about the supporting shaft and is located between the rear abutment projection and an inner surface of the portion of the sliding plate holder defining the axial slot or holes for the shaft. The coil spring pushes the locking block leftward (as shown in the figures) while in its natural state and causes the locking tongue of the locking block to be inserted into the axial wall hole or slot of the fixed holder sleeve to prevent the sliding plate holder from swiveling relative to the fixed holder sleeve. On the peripheral wall of said fixed holder sleeve a single or a plurality of elongated axial wall slots, or locking holes are provided.

An elongated push plate has one end formed with a cut-off, circular arc head portion, and an opposite lower end formed with a rack arrangement. As noted, the circular arc head portion is received within one of the reception slots of the salient member. The diameter of the head precludes vertical escape of the push plate past the opening formed in the circular reception slot, but is small enough that the push plate can be inserted lengthwise into an open end of the reception slot. The push plate is comprised of several serial spaced protrusions which form a saw teeth like arrangement. The circular arc head portion of said push plate is rotatably fitted in one of the supporting reception slots of the salient member which extends along the under surface of the sliding plate. When the push plate is in a vertical state, the rack portion with its saw teeth outer edge has its teeth aligned with the locking teeth on the top surface of the sliding plate holder's sleeve portion, e.g., in a state of mutual meshing engagement. The saw teeth outer edge is preferably meshed with the front tooth-like projection of the locking block.

An elongated cam plate is provided in the other, adjacent reception slot formed in the salient member. The elongated cam plate has an upper end that is a cut-off, circular arc head portion and a lower portion that defines a cam portion. A first side surface of the cam portion has an arc surface similar to a circular arc, the opposite (e.g. right) side surface defines an acute angle in cross-section with a rounded tip at the vertex. The circular arc head portion of said cam plate is rotatably fitted in the second reception slot of the salient member which extends along the under surface of the sliding plate when the sliding plate is mounted in its final, operational position. The arc head is of a diameter which vertically fixes the cam plate in position but which allows for sliding insertion into an open end of the second reception slot. The lower portion of the right side surface of the cam portion is located adjacent to the interior surface of the rear abutment projection which forms part of the cam receipt recess of the looking block.

A tension (pull back) spring has one end fixed or in a hook connection with the hook reception member formed at the bottom of the sliding plate and an opposite end that is in a hooked connection or a fixed connection with the lower end of the push plate. With this arrangement, the tension spring, when under a normal state, pulls the push plate in a first direction (e.g. counter-clockwise) to place the push plate's lower saw teeth end in a meshing engagement with the locking teeth on the holder's sleeve portion (i.e. the saw teeth and locking teeth are longitudinally aligned with each other when in meshing arrangement and the push plate is vertically oriented).

A handle is provided which is comprised of a handle bar and fastener plate forming the supporting base for the handle bar. The handle bar is preferably V-shaped. The fastener plate is fixed firmly to an axial end of the cam plate shaft with a bolt or the like. As noted, the cam plate shaft and push plate shaft are vertically retained in the slots of the respective salient portions due to their head portions being larger in diameter then the respective outer openings of the slots. The push plate is longitudinally fixed byway of threaded stops or bullets provided at the threaded, opposite ends of the corresponding push plate reception slot. The cam plate is retained from moving longitudinally or lengthwise by a non-coiled portion of the pull back spring extending transversely through a cut-out or recess formed at one end of the cam plate. The fastener plate forming the base of the handle also is connected with the opposite end of the cam plate and abuts the end of the sliding plate.

Under the arrangement described above, if swiveling is desired, the operator merely rotates the single handle in a first direction (e.g. counterclockwise) whereby the cam plate alone moves and in its movement pushes the rear abutment surface of the locking thrust plate and the locking tongue portion integral therewith so that the tongue portion is moved out of engagement with the slot or hole formed in the fixed holder sleeve. The inwardly extending ring sleeve in the sliding plate holder's sleeve portion includes a butterfly shaped plate section which supports two guide protrusions which have opposing surfaces that together provide a guiding surface for the shifting locking tongue portion. The ring sleeve also includes a slot which is aligned with the opposing surfaces of the two guide protrusions so that the locking tongue can be shifted into and out of the locking position.

Since the thrust plate is spring biased by the coil spring on the shaft into a locking state, the operator's release of the handle causes the handle to return to its neutral state. In the neutral state, the central axis of the handle's fastener plate is vertically oriented and the cam plate is in contact with the push plate. Also, the push plate is vertically positioned due to the action of the pull back coil spring, which is interconnected with the push plate, forcing the push plate into contact with the cam plate. The cam plate is held in position due to the action of the coil spring on the shaft forcing the interior surface of the rear end protrusion of the thrust plate into contact with the cam plate whereby the cam plate is sandwiched between the biased thrust plate and biased push plate.

If longitudinal sliding of the sliding plate is desired, the operator merely rotates the handle in an opposite direction (e.g., clockwise) against the force of the pull back spring whereupon the cam plate that is rigidly fixed to the handle forces the adjacent push plate out of meshing engagement with the teeth of the sliding plate. During this movement, the thrust plate is unaffected such that the fixed holder sleeve remains locked from rotation about a vertical axis. The disengagement of the push plate's teeth from the spaced teeth of the sliding plate and the front tooth like projection of the thrust plate frees up the sliding plate such that a force applied along the longitudinal direction, which is sufficient to overcome the static friction bond between the sliding plate and sliding plate holder (or the lower friction level of a bearing arrangement), results in the sliding plate sliding longitudinally within the sliding plate holder.

The pull back spring, which is connected at one end to the sliding plate, extends through an open slot in the cam plate and is engaged at on opposite end with the push plate, forces the push plate (and the adjacent cam plate) back into the neutral, vertical position following release of the handle.

The preferred arrangement described above features a fixed holder sleeve extending up from a fixed base, the sliding plate holder pivotably mounted on the free end of the fixed holder sleeve and the sliding plate slideable with respect to the longitudinally fixed holder sleeve and sliding plate holder. With this arrangement, a chair or the like would extend from the sliding plate and be fastened therewith. The arrangement of the present invention can be altered, however. For example, a sliding plate can be rigidly attached to the floor and the sliding plate holder and holder sleeve could be longitudinally shifted with respect to the fixed sliding plate whereupon the handle can be activated as a foot pedal rather than a hand operated lever.

This sliding and swiveling device of the present invention, in comparison with devices of the prior art, greatly simplifies and reduces the structural requirements, number of components and degree of processing required for production. Moreover, the sliding and swiveling device of the present invention allows for single handle control of the actions of the two devices such that it is convenient in operation, reliable, stable, relatively simple in structure, low in maintenance and low in production cost and labor intensity of workers.

BRIEF DESCRIPTION OF THE DRAWINGS

Particular features of the present invention will be more clearly apparent from the following description of the preferred embodiments of the invention illustrated in the annexed drawings, wherein.

DETAILED DESCRIPTION OF THE PREFERRED EMBODIMENTS

Structure

Referring to FIGS. 1–4 and 8–12, for example, the cam locking type sliding and swiveling device of the present invention comprises a sliding plate 1, a sliding plate holder 2, a fixed holder sleeve 3, a push plate 4, a cam plate 5, a tension or pull back spring 6, a supporting shaft 7, a coil spring 8, a thrust plate 9, and a handle 45. Sliding plate i comprises an upper quadrangle or quadrilateral planar plate portion 11 which forms a securement base for an attachment unit (600, FIGS. 9–11) such as a chair or some other object to be longitudinally shifted and/or rotated.

Along each of the sliding plate's longitudinal side edges is integrally formed convex edge portions 12 extending off (e.g. downward) from the bottom surface of planar plate portion 11. At a location laterally intermediate of the plate's side edges, there is positioned salient member 10 protruding downward from the bottom of the plate. Salient member 10 extends for the full longitudinal length of the plate between the plate's ends. The salient member 10 has a protruding height which is less than that of the convex edge portions 12.

On each convex edge portion 12, a sliding slot 13 is provided which extends along the longitudinal length of the convex edge such that each slot is opposite to each other so as to be in a mirror image, facing relation. On the salient member 10 along its longitudinal direction there is a pair of left and right reception slots 21, 22 each with an opening at its external most (e.g. downwardmost) end. The reception slots are arranged in a parallel arrangement with independent, inwardly curving exterior side walls and a common, intermediate side wall which is curved to form the interior sides of the essentially circular reception slots. The intermediate side walls thus conform with the curved exterior walls and the intermediate wall extends in two opposite directions at its lowermost end. The width of the opening in each of the two reception slots 21, 22 is made less than the reception slot's diameter.

Figure 3:
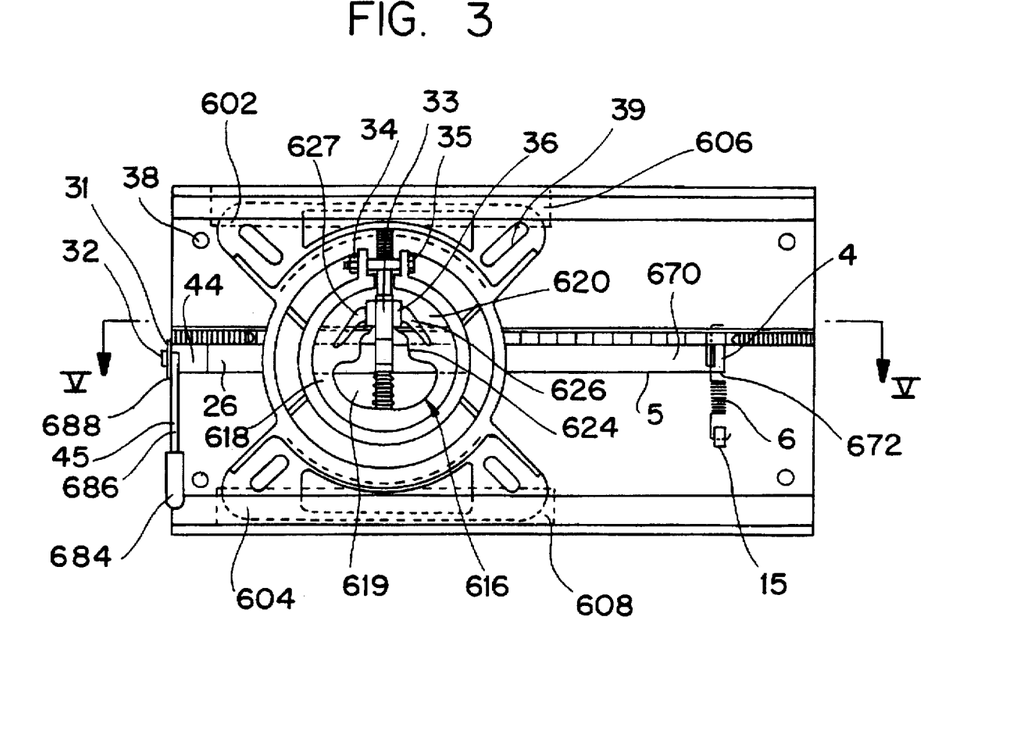
FIG. 3 is a bottom view of the first embodiment shown in cross-section In FIG. 1.

The sliding plate 1 also serves as a mounting surface for an attachment unit 600 such as a table, chair or instrument apparatus, and the sliding plate is preferably provided with several mounting holes 38 on the plate portion 11, as shown in FIG. 3. Hook reception member 15 which protrudes downward is also provided under the plate portion 11 in a lateral intermediate area between the reception slot 22 and most adjacent convex edge portion 12.

Sliding plate holder 2 comprises a holder plate portion 14, a sleeve portion 19 and a few webs and ribs positioned outside the sleeve portion and between the holder plate portion and the sleeve portion in order to join them firmly with each other. Holder plate portion 14 includes two horizontal side flange segments 602, 604 which are primarily slidably inserted into the sliding slots 13 under plate portion 11 at its two side edges. To facilitate longitudinal forward and backward movement of sliding plate holder 2 or, more particularly, flanges 602 and 604, there are provided two low friction sliding inserts 606 and 608 positioned on respective side flanges 602 and 604 (shown in dashed lines in FIGS. 3 and 4 to provide added clarity with respect to the discussion of the other components). Inserts 606 and 608 can be formed of a low friction material such as a plastic material (e.g., Teflon® material). The inserts can either be secured by adhesive or the like to the flanges such that the exterior surface of the inserts slide in slots 13 or the inserts can be secured to the slot and extend the full length of the slot so that the flanges slide within a reception groove in the insert.

Figure 1:
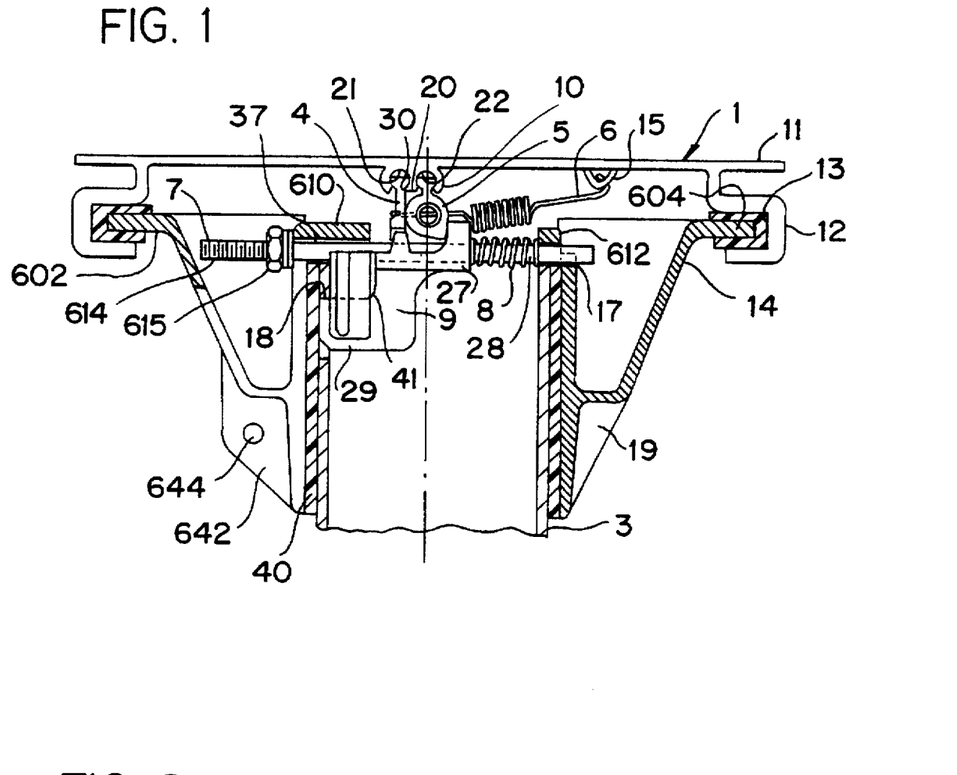
FIG. 1 is a sectional view of a first embodiment of the cam locking type sliding and swiveling device of the present invention, showing the push plate in a vertical state with its saw teeth slots in meshing engagement with the sliding plate holder's locking teeth.
Figure 2:
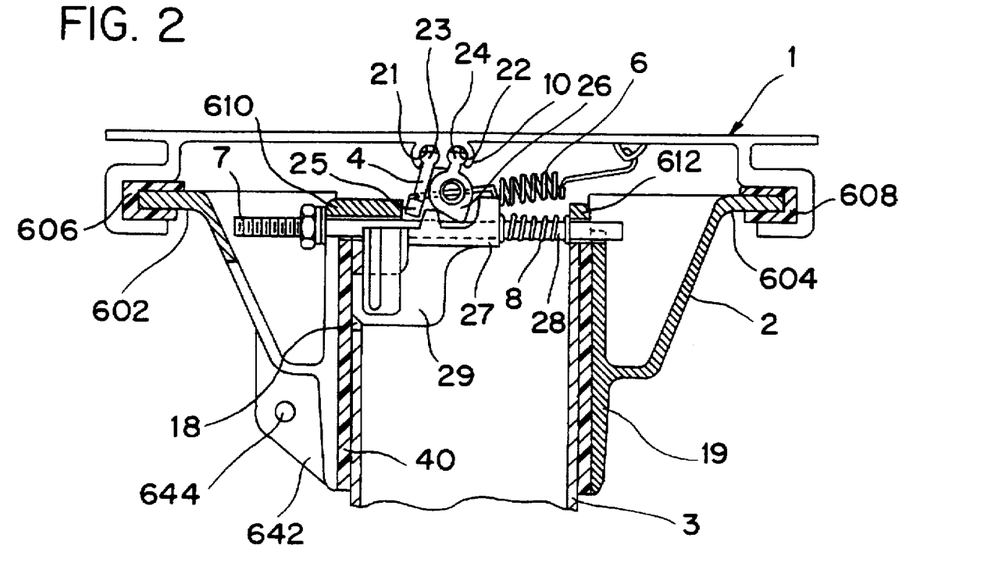
FIG. 2 is a sectional view of the cam locking type sliding and swiveling device of the first embodiment showing the push plate having been rotated in the clockwise direction so as to assume a disengaged state with respect to the locking teeth on the sliding plate holder.
Figure 4:
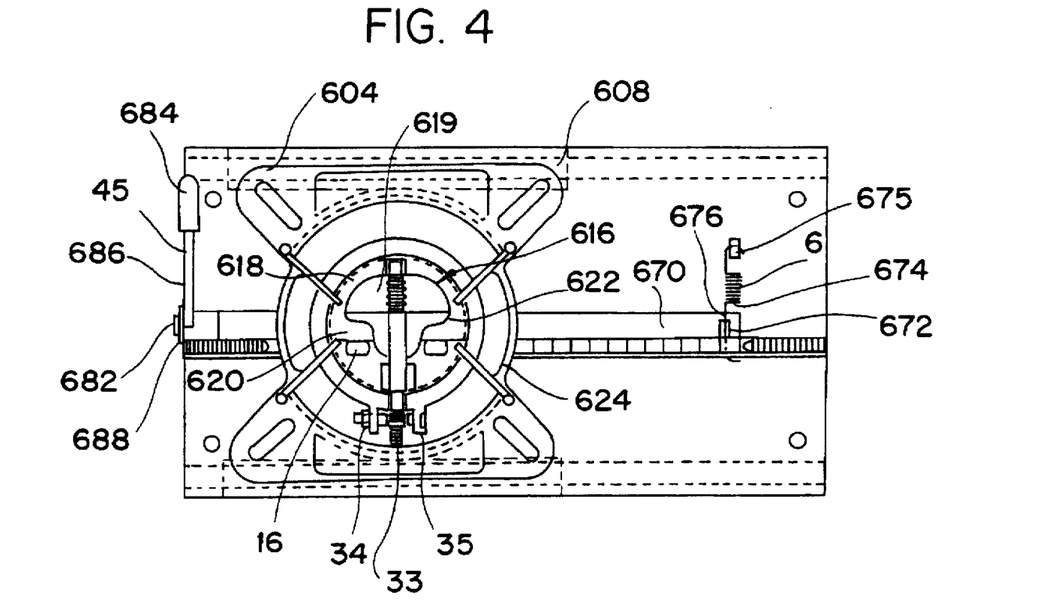
FIG. 4 is a top view of the sliding plate holder and sliding plate with the sliding plate shown in dashed lines to facilitate an analysis as to how the components are assembled on the sliding plate.

As best shown in FIGS. 1, 2 and 4, the upper end of the holder's sleeve portion 19 features radially opposed semi-cylindrical protrusions 610 and 612 which partially define radially opposed shaft support holes 17 and 37. Shaft 7 extends through the radially opposed holes 17 and 37 at a level below salient member 10 and are essentially aligned with the lower leg of convex edge portions 12. Shaft 7 includes threaded end 614 with nut 615 acting to axially fix shaft 7 in position in the two radially opposed holes 17 and 37.

As shown in FIG. 4, there is a rigidly fixed or integrally formed horizontal ring plate 616 at the upper end of a sleeve portion 19 which, together with semi-cylindrical protrusions 610 and 612, also partially defines the radially opposed holes. Ring plate 616 includes a thinner section 618 which defines a semi-circular aperture 619. Ring plate 616 also includes two thicker sections 620 and 622 which each support one of two upwardly extending teeth 16 which are longitudinally aligned along a common axis. Thicker sections 620 and 622 are spaced from one another to define thrust slot 624 which opens into semi-circular aperture 619. Thrust slot 624 includes an interior wider section which converges to a straight slot portion that extends to the wall of sleeve portion 19. The straight slot portion of thrust slot 624 is aligned with the central axis of shaft 7.

As shown in FIG. 3, thicker sections 620 and 622, on a side opposite to the side supporting teeth 616, support spaced bridge members 626, 627 which extend downwardly and internally within sleeve 619 and define a slot which opens into the straight slot portion of thrust slot 624.

With reference to FIGS. 1, 2 and 9–11, locking or thrust block 9 is illustrated as having locking tongue portion 29 which extends downwardly from tongue base 628 and is slideable within the slot defined by bridge members 626, 627. Tongue base 628 comprises tooth projection 630 positioned closest to the outward end 632 of tongue portion 29. Base 628 further comprises spring contact projection 634 and cam reception cavity 636 positioned between tooth projection 630 and spring contact projection 634. Base 628 further comprises shaft through-hole 638 which extends through both projections 630 and 634. Shaft through-hole 638 is sized to slidingly receive shaft 7. Coil spring 8 is positioned on shaft 7 between spring contact projection 634 and the interior of sleeve portion 19 as shown in FIG. 2. Spring 8 is designed to force tongue end 632 into a tongue reception slot 18 formed along an upper portion of fixed sleeve 3.

Sandwiched between fixed sleeve 3 and sleeve portion 19 of the sliding plate holder 2 is plastic spacer sleeve 40.

Figure 5:
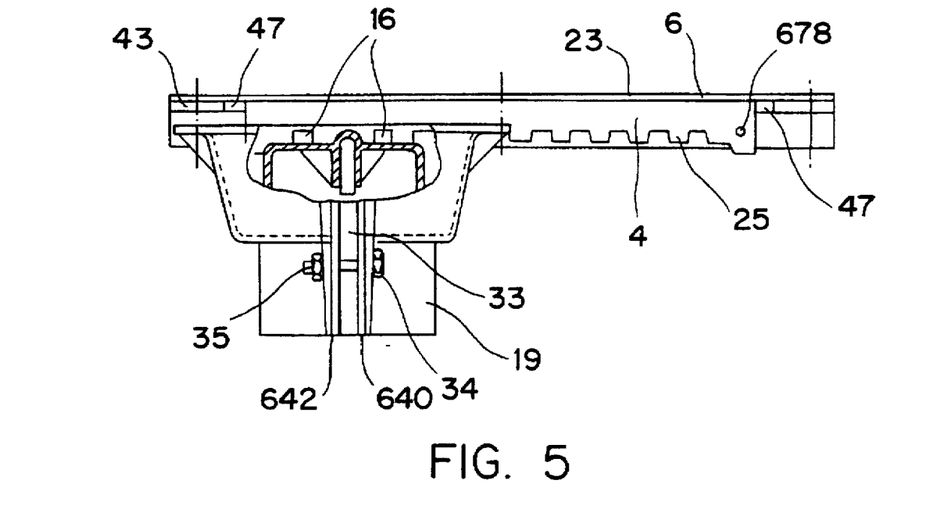
FIG. 5 includes a partially broken away side elevational view of the sliding plate holder of the present invention and a cross-sectional view of the sliding plate taken along cross-section line V—V in FIG. 3 so as to show the rack portion of the push plate in mesh engagement with locking teeth of the sliding plate holder.

Spacer sleeve 40 is a slotted sleeve with its slot being aligned with tongue reception slot 18 in fixed sleeve 3. Similarly, as shown in FIG. 5, sleeve portion 19 is a slotted sleeve with its slot 33 aligned with that of sleeve 40 and slot 18. Holder 2 includes a pair of clamping ribs 640, 642 with aligned bolt holes 644 for receiving nut and bolt combination 34, 35 (FIGS. 4 and 5) which allows for micro adjustments in the width of the slot of sleeve 19 and 40 to achieve a designed degree of compression on plastic sleeve 40 positioned between fixed sleeve 3 and sleeve portion 19 of holder 2.

The fixed sleeve 3 represents the upper end of a fixed holder assembly which typically includes a base (not shown) secured to the lower end of the sleeve 3. The base is usually firmly secured to an underlying surface such as the floor or ground. In the illustrated invention, on the upper peripheral surface of the fixed holder sleeve 3, there is provided one axially disposed slot 18. Preferably, 1–12 equally circumferentially spaced and axially extending slots are provided in fixed sleeve 3, although only one slot 18 is shown in the illustrated embodiment. The additional slots allow for the possibility of locking the attachment unit 600 in any one of a plurality of rotation settings.

Figure 9:
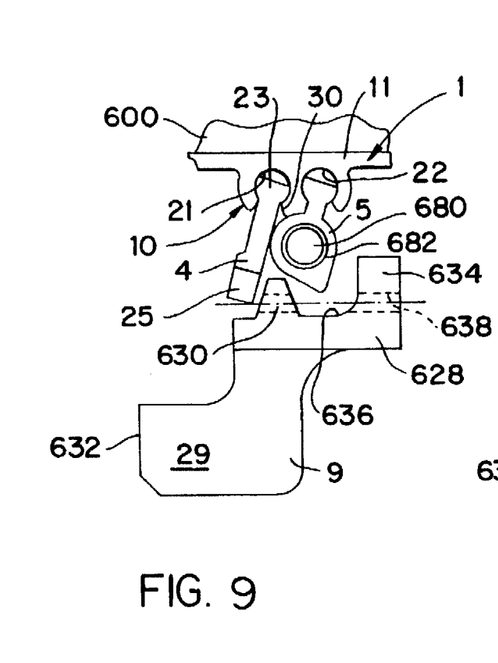
FIGS. 9, 10 and 11 show, respectively, the free sliding position, neutral position, and free rotation position for the thrust plate, cam plate and push plate of the present invention.

Push plate 4, as best illustrated in FIGS. 5 and 9, is an elongated, small width plate, which has circular arc head portion 23 located at its upper end and a rack portion 25 constituted of several rectangular teeth located at its lower end. The circular arc head portion preferably is semi-cylindrical in cross section and is mounted such that it can rotate both clockwise and counterclockwise in reception slot 21 formed within the salient member 10. The width or diameter of head portion 23 is such that it is vertically fixed within reception slot 21.

Figure 10:
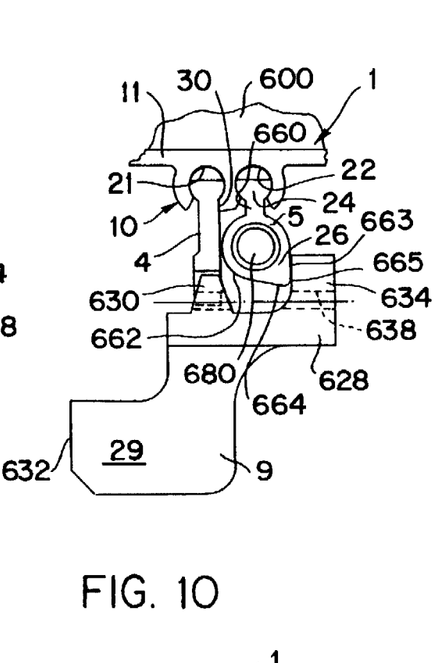
Figure 13:
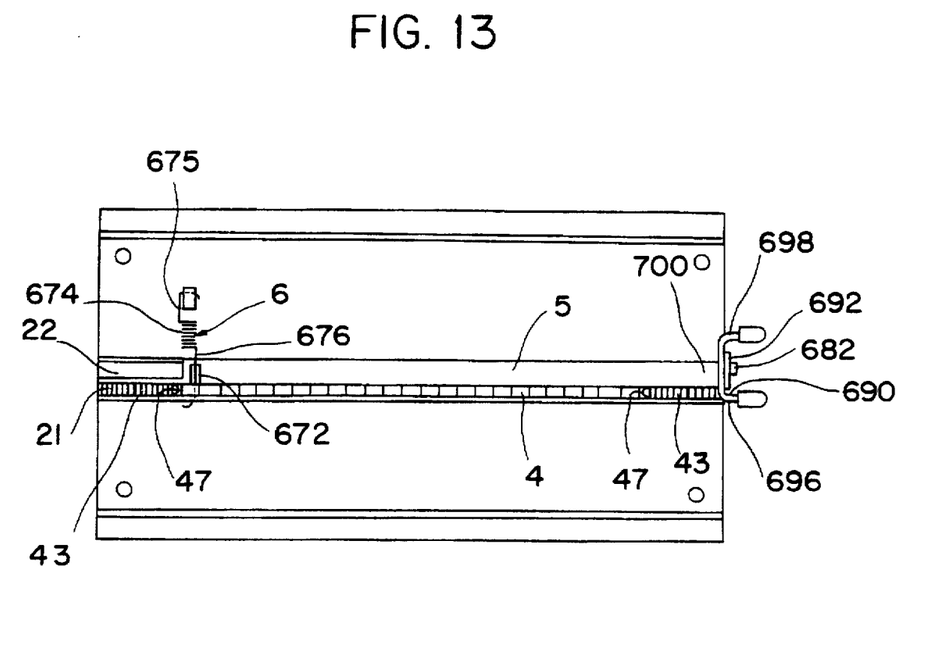
FIG. 13 is a bottom view of another embodiment of the present invention which has its plates in a neutral condition and which is the same as the first embodiment except for the handle design.

When the sliding plate is in a non-adjustment, fixed state, as shown in FIGS. 1 and 10, rack portion 25 is meshed with locking teeth 16 provided on the top surface of ring 616 of sleeve portion 19. Teeth 16 and tooth projection 630 of thrust plate 9 are arranged in a straight line, i.e. the sliding plate 1 is in a longitudinally locked state due to the push plate mounted on it being in mesh with locking teeth 16 on the sliding holder so that sliding plate 1 cannot be moved longitudinally forward and backward. Also, in order to prevent push plate 4 itself from moving longitudinally in reception slot 21, threaded slot sections 43 are provided on both ends of the reception slot 21 and set or bullet screws 47 are threaded into contact position with the opposite ends of plate 4. These components are best illustrated in FIGS. 5 and 13.

As best shown in FIGS. 1, 3 and 10, cam plate 5 is also an elongated plate which has a circular arc head portion 24 located at its upper portion, a cam portion 26 located at its lower portion and an intermediate neck section 660 which connects the upper and lower portions. As with push plate 4, head portion 24 is a semi-cylindrical member and has a width or diameter which precludes release from reception slot 22 in a vertical direction while allowing for longitudinal insertion. Cam plate 5 can thus, through its head portion 24, rotate clockwise and counter-clockwise in reception slot 22. Left surface 662 (as shown in FIG. 10) of cam portion 26 is basically a circular arc surface, while right surface 663 is comprised of a lower, approximately flat arc surface 664 and an upper approximately flat arc surface 665 with the latter two surfaces diverging in a right to left direction as shown in FIG. 10.

With reference to FIGS. 1–4 and 13, cam plate 5 extends within slot 22 and has at end 670 lateral groove or recess 672. Pull or tension spring 6 includes a central coil section 674, two straight wire sections 675, 676 which extend into hook connections. The hook connector for wire section 675 is received within a slot defined by hook reception member 15 of sliding plate 1. The opposite hook connector is received, as shown in FIG. 5, within pin hole 678 formed in the end of push plate 4.

Figure 11:
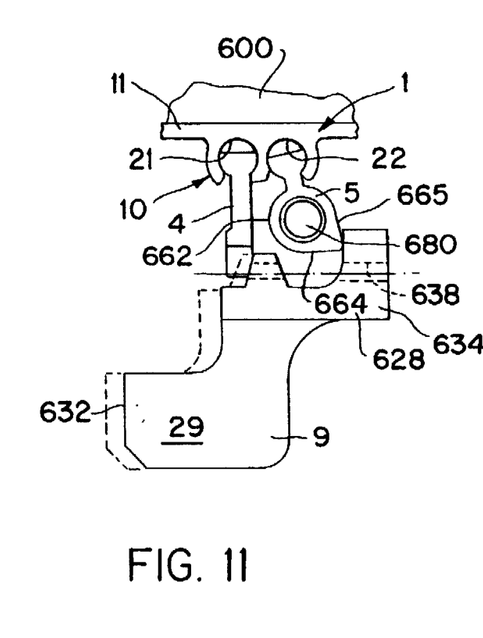

As shown in FIGS. 9–11, cam plate 5 includes a hollow central core 680. Hollow core 680 preferably extends along the entire length of cam plate 5 so as to open out at opposite ends thereof. At the end of the cam plate opposite the end where reception groove 672 is formed, hollow core 680 is provided with threads 682 (FIG. 9). Threads 682 threadably receive bolt 32 which extends through the base of a first embodiment of a handle referenced by reference 45 in FIGS. 3 and 4. Handle 45 also includes handle grip 684. The first handle embodiment shown in FIGS. 3 and 4 features a straight shaft 686 joined with base 688 which is rigidly secured to cam plate 5 via bolt 682.

Figure 16:
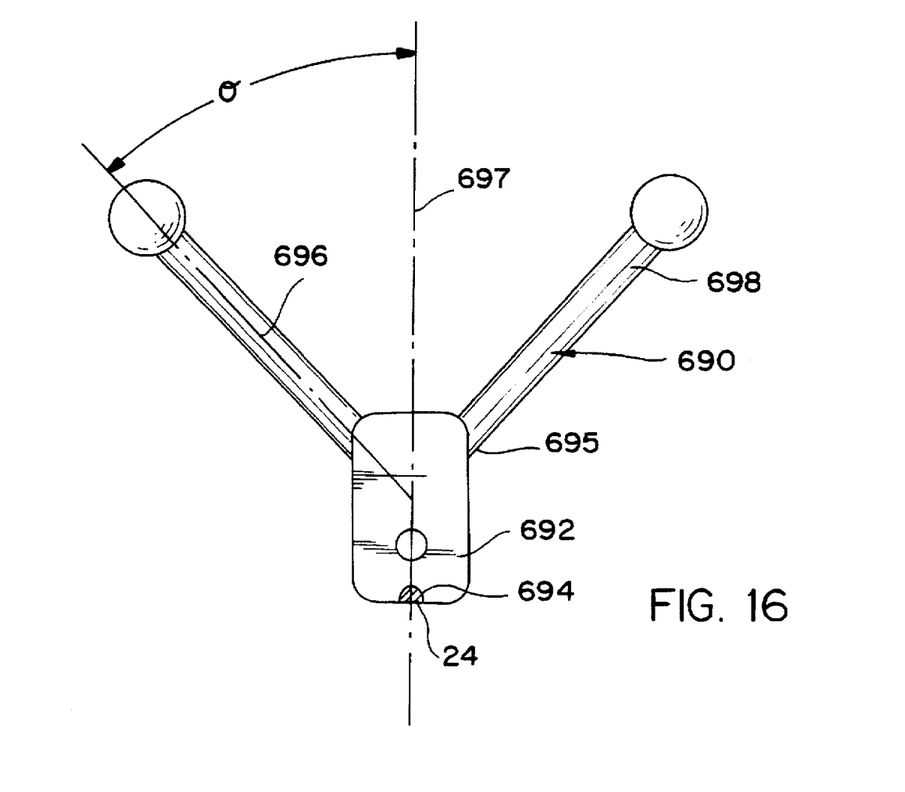
FIG. 16 shows a front elevational view of the handle shown in FIG. 13.

FIGS. 13 and 16 illustrate second handle embodiment 690 which is comprised of flat base plate 692 to which is rigidly secured (e.g., welded) handle bar 605 which is V-shaped so as to have left and right handle bar sections 696, 698. Handle 690 is rigidly fixed to cam plate 5 such that rotation of one handle bar section or the other causes cam plate 5 to rotate together with the handle.

In a preferred embodiment, semi-cylindrical head 24 at the upper end of cam plate 5 extends longitudinally further than the remainder of the cam plate and is received within notch 694 formed in plate 692 as shown in FIG. 16. Also, bolt 682 formed in plate 692 extends through bolt hole 696 in securement plate 692 and is threadably received by the threaded through-hole in cam plate 5. As shown in FIG. 16, handle bar sections 696 and 698 are equally spaced off from center line 697 each at angle θ therefrom which is preferably 30° to 60° and more preferably 45°.

Figure 14:
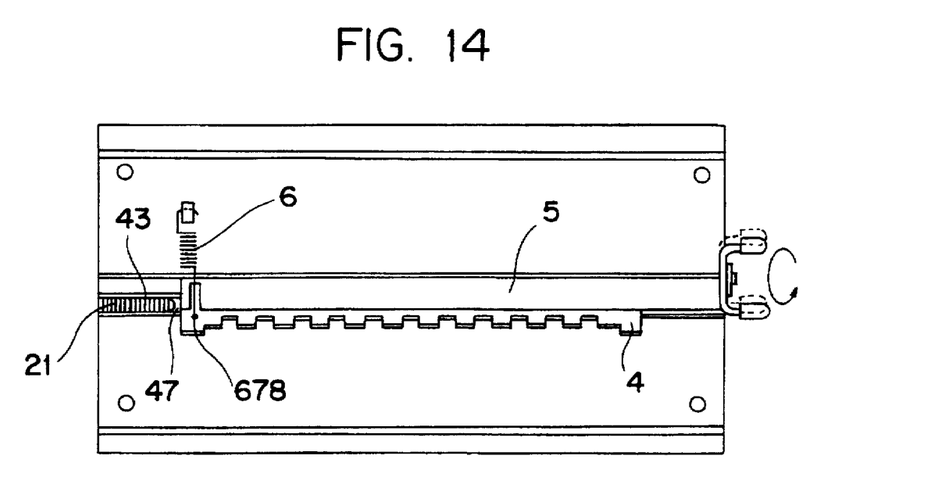
FIG. 14 shows a view similar to FIG. 13 except for the components being in a free slide position.

Instead of bolting the handle to the cam plate, the handle can be integrally formed or permanently affixed (e.g., welding) to the cam's plate end. Also, as shown in FIG. 14, the handle is preferably dimensioned so as to extend out past the end of the slide plate 1 for easy grasping. With the handle bar arrangement of FIG. 14, one handle bar section can be pulled upward to achieve the desired state while the same state can also be achieved by pushing down on the opposite handle bar section. The desired angle of rotation for cam plate 5 to achieve the desired state is preferably 10°–20° and more preferably 17°. This angle of rotation is easily achieved with the handle bar sections of the present invention which are preferably 40°–50° upwardly off the vertical center line 697 bisecting handle bar sections 696 and 698 and extending below the handle fastening bolt.

To help in ensuring that tension spring 6 pulls push plate 4 back to the correct (e.g., vertical) position wherein its rack portion is in renewed engagement with locking teeth 16, on the left lower side of partition wall 20 (as viewed in FIG. 12), there is provided vertical surface 30 in intermediate wall 20 of salient member 10. Vertical surface 30 comes in contact with the planar rear surface of the push plate as shown in FIGS. 9 and 10.

Handle 690 is thus easily manipulated by lifting up (or pushing down) only on one of the handle bar sections to initiate upward rotation of the entire handle bar. (If plate 1 represented a track for a shifting holder, then "handle" 6 would represent a foot pedal that can easily be rotated upon stepping down or holding down with one's hand the desired handle bar section.)

Operation

To facilitate an understanding of how the present invention operates, an explanation is first provided as to the operation of the push plate and cam plate with the sliding plate holder removed.

Figure 8:
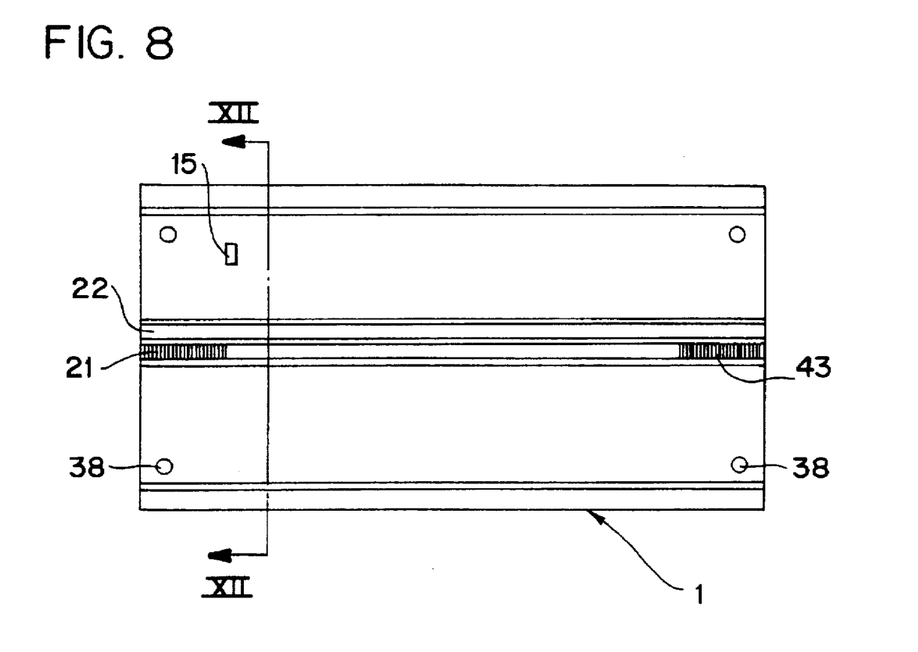
FIG. 8 is a bottom view of the sliding plate of FIG. 1 alone.
Figure 12:
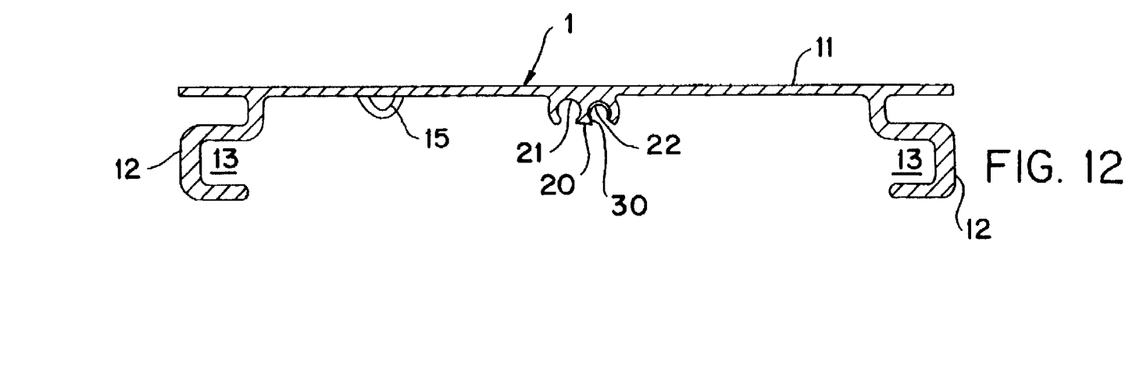
FIG. 12 shows a side elevational view of the sliding plate shown in FIG. 8.

FIGS. 8 and 12 show the undersurface of sliding plate 1 alone. As shown in FIG. 8 reception slots 21 and 22 extend the full length of plate 1 and are sized so as to receive push plate 4 and cam plate 5, respectively. FIG. 13 shows push plate following the sliding of head 23 longitudinally within an open end of reception slot 21. At opposite ends of slot 21 there are provided threaded sections 43. Bullet screws 47 are threaded inwardly until contact is made with a centered push plate 4 rotatably fixed therebetween. The head 24 of cam plate 5 is sized so as to have the first end 700 essentially aligned with an end of plate 1 where handle 690 is to be positioned. The passage of straight spring section 676 through slot 672 in combination with securement plate 692 fixed to the opposite end of cam plate 5, fixes cam plate 5 longitudinally within reception slot 22.

FIGS. 9 and 14 illustrate rotation of the handle (either 45 or 690) in a first direction for unlocking the longitudinally locked sliding plate from the neutral state shown in FIG. 13. As shown in FIGS. 9 and 14, the rotation of cam plate 5 in the first direction (clockwise in FIG. 9) causes surface 662 of cam plate 5 to force the push plate's teeth out of engagement with the aligned teeth 16 on support ring 616 and the aligned tooth projection 630 of thrust plate 9 (which remains stationary during rotation of the cam plate in the first direction). Also, rotation of both camplate 5 and push plate 4 causes tension spring 6 to be stretched out of its neutral state. Once mesh teeth 25 of push plate 4 are rotated out of alignment with the teeth 16 and tooth projection 630 and as soon as sufficient longitudinal force is applied to overcome the static friction bond between convex sliding slot 12 and plastic liner 608, sliding plate 1 and attachment unit 600 are shifted longitudinally with respect to the stationary sliding plate holder 2 and fixed holder sleeve 3.

Once the handle is released following the longitudinal shift in position of the sliding plate, a new set of meshing teeth on push plate 4 meshes with teeth 16 and projection 630 of thrust plate 9 which remained stationary while the sliding plate 1 and push plate 4 were shifted longitudinally. This remeshing is caused by the spring 6 causing push plate 4 to return to its neutral (e.g., vertical) state.

Figure 15:
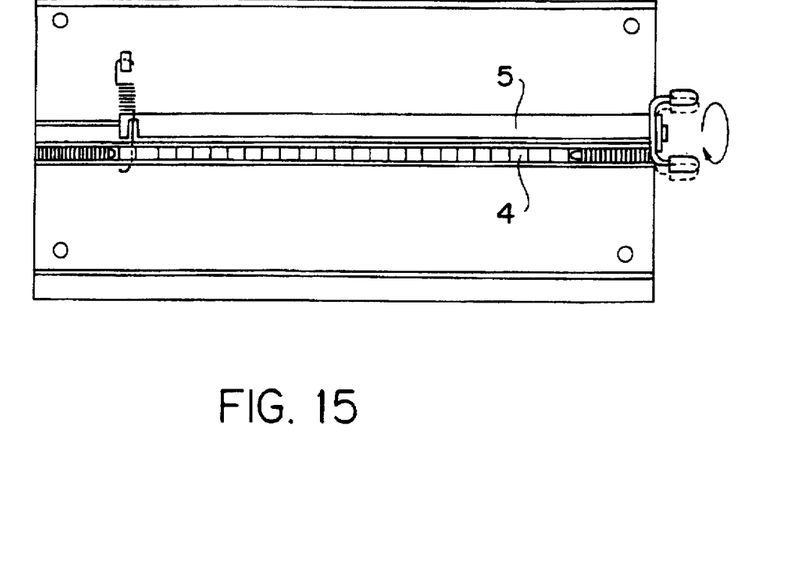
FIG. 15 shows a view similar to FIG. 13 except for the components being in a free swivel position.

FIGS. 11 and 15 illustrate the movement of cam plate 5 out of its vertical neutral state upon rotation of the handle in a second direction which is opposite to the first direction. Rotation of the handle in the second direction causes a simultaneous rotation of cam plate 5 out from its neutral position. The intermediate coil portion of pull back spring 6 is preferably spaced far enough away from cam plate 5 as not to contact the cam plate during rotation of the cam plate in the second direction. The reception groove 672 allows for movement of the cam plate without vertically shifting the straight portion of spring 6 received within groove 672.

Movement of cam plate 5 in the second direction of rotation causes cam surface 663 to abut against projection 638 of thrust plate 9 so as to shift locking tongue 29 along shaft 7 sufficiently to cause end 632 of tongue portion 29 to move inwardly out of engagement with the slot in fixed holder sleeve 3. Once end 632 of tongue portion 29 clears the interior surface of fixed holder sleeve 3, sliding plate holder 2 with attached and longitudinally locked sliding plate 1 can be rotated the desired amount. Sliding plate 1 can then be rotated in either direction until the handle is released such that the locking tongue again becomes aligned with the slot in sleeve 3 and compressed spring 8 causes the tongue to expand into the locking slot in the fixed holder sleeve 3. The fixed holder sleeve 3 can also be formed with a plurality of spaced (e.g., equally spaced) slots to allow for specific stepped rotation adjustments in the longitudinally fixed sliding plate.

Figure 6:
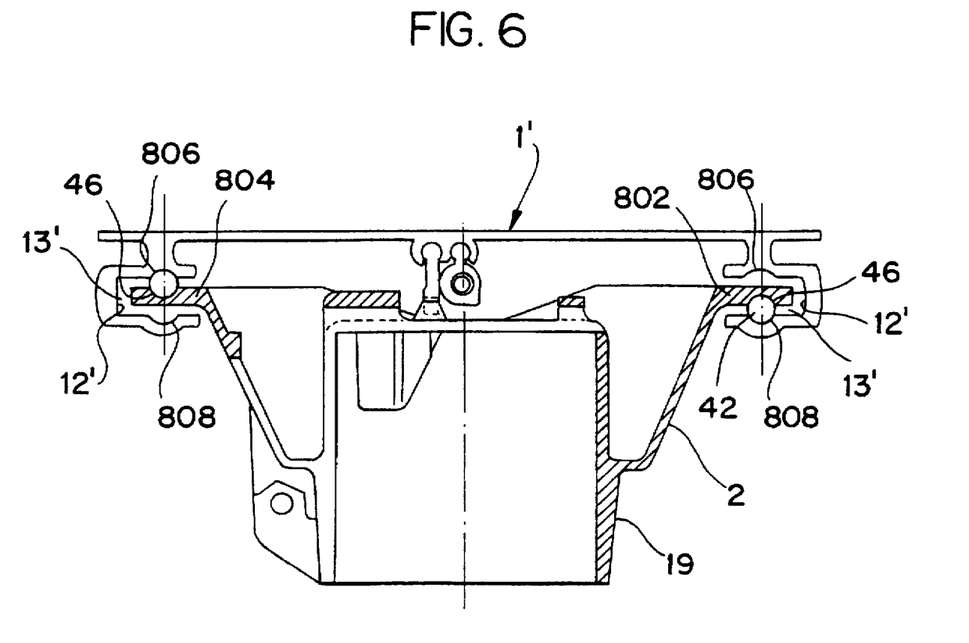
FIG. 6 is a sectional view of a second embodiment of the cam locking type sliding and swiveling device of the present invention with the sliding plate holder shown in cross-section.
Figure 7:
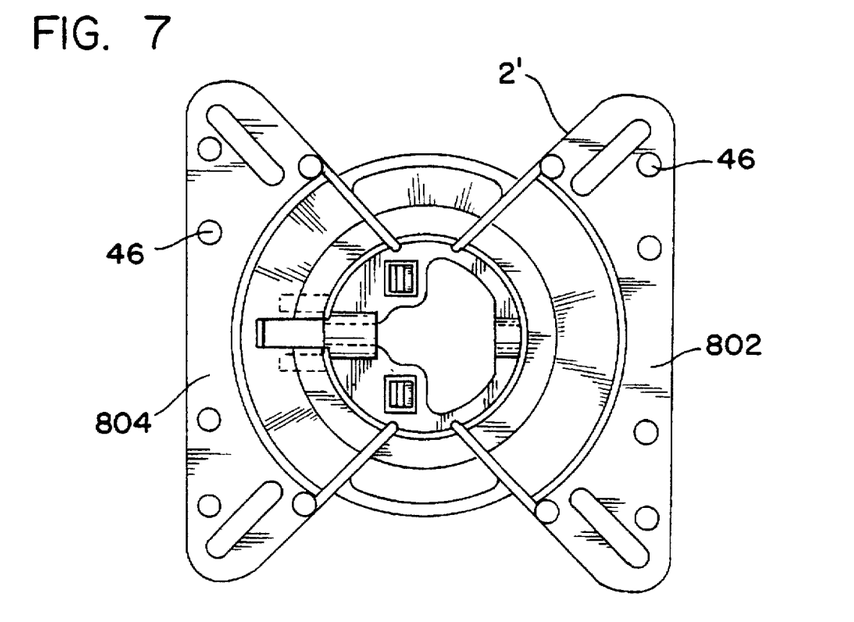
FIG. 7 is a top view of the sliding plate holder shown in FIG. 6, the sliding plate and thrust plate assembly having been removed.

FIGS. 6 and 7 illustrate another embodiment of the invention wherein sliding plate holder 2' includes flanges 802 and 804 which each include a plurality of semi-spherical depressions 46 which in flange 804 are positioned on an upper surface of the flange and on flange 802 are positioned on a bottom surface. Slot 13' of convex slides 12' each include upper longitudinally extending surface 806 and lower longitudinally extending surface 808. Ball bearings are positioned in the semi-spherical recesses 46 as shown in FIG. 6, wherein sliding plate 1' is easily shiftable upon rotation of the handle to the "allow slide" position.

The Chinese priority application No. 95 2 44619.7 filed on Aug. 29, 1995 is incorporated herein by reference in its entirety.

Although the present invention has been described with reference to preferred embodiments, the invention is not limited to the details thereof. Various substitutions and modifications will occur to those of ordinary skill in the art, and all such substitutions and modifications are intended to fall within the spirit and scope of the invention as defined in the appended claims.

What is claimed is:

1. A sliding and swiveling device, comprising:
   a sliding plate which includes a surface for supporting an attachment unit and two laterally spaced sliding portions;
   a holder which includes a pair of laterally spaced sliding sections which are in a sliding relationship with respect to the two sliding portions of said sliding plate, said holder further comprising a sleeve portion which is dimensioned for receiving a sleeve member in a swivel relationship;
   first locking means for releasably locking said sliding plate and holder against rotation with respect to the sleeve member;
   second locking means for releasably locking said sliding plate and holder against relative longitudinal sliding;
   a handle member;
   means for triggering a release of said first locking means upon adjustment of said handle member in a first direction and for triggering a release of said second locking means upon adjustment of said handle member in a second direction, and wherein said handle member is supported by said sliding plate and moves together with said sliding plate both when said first locking means is released and said sliding plate is rotated with respect to the sleeve member and when said second locking means is released and said sliding plate is shifted longitudinally with respect to the sleeve member.

2. A device as recited in claim 1, wherein said second locking means includes a push plate rotatably supported by said sliding plate and having a series of engagement protrusions and recesses formed along a free longitudinally extending edge thereof, and said second locking means further comprising one or more protuberances which are designed for reception within said recesses of said push plate and are supported by an end of said sleeve portion.

3. A device as recited in claim 2, wherein said first locking means including a shaft supported by said sleeve portion and a thrust plate slideably supported by said shaft such that the thrust plate is shiftable into and out of a slot formed in the sleeve member.

4. A device as recited in claim 3, wherein said means for triggering includes a cam plate rotatably supported by said sliding plate and positioned adjacent said push plate such that upon rotation of said handle member in the first direction said cam plate contacts said thrust plate so as to shift said thrust plate along said shaft so as to unlock said first locking means and upon rotation of said cam plate in said second direction said push plate is rotated out of engagement with said protrusions so as to unlock said second locking means.

5. A device as recited in claim 1, wherein when said triggering means is activated so as to release said first locking means, said second locking means remains in a locking state and when said triggering means is activated so as to release said second locking means, said first locking means is in a locking state.

6. A sliding and swiveling device, comprising:
   a sliding plate which includes a surface for supporting an attachment unit and two laterally spaced sliding portions;
   a holder which includes a pair of laterally spaced sliding sections which are in a sliding relationship with respect to the two sliding portions of said sliding plate, said holder further comprising a sleeve portion which is dimensioned for receiving a sleeve member in a swivel relationship;
   first locking means for releasably locking said sliding plate and holder against rotation with respect to the sleeve member;
   second locking means for releasably locking said sliding plate and holder against relative longitudinal sliding;
   a handle member;
   means for triggering a release of said first locking means upon adjustment of said handle member in a first direction and for triggering a release of said second locking means upon adjustment of said handle member in a second direction, and wherein said second locking means includes a push plate rotatably supported by said sliding plate and having a series of engagement protrusions and recesses formed along a free longitudinally extending edge thereof, and said second locking means further comprising one or more protuberances which are designed for reception within said recesses of said push plate and are supported by said sleeve portion,
   and said first locking means including a shaft supported by said sleeve portion and a thrust plate is slideably supported by said shaft such that the thrust plate is shiftable into and out of a slot formed in the sleeve member,
   and said means for triggering including a cam plate rotatably supported by said sliding plate and positioned adjacent said push plate such that upon rotation of said handle member in the first direction said cam plate contacts said thrust plate so as to shift said thrust plate along said shaft so as to unlock said first locking means and upon rotation of said cam plate in said second direction said push plate is rotated out of engagement with said protrusions so as to unlock said second locking means.

7. A device as recited in claim 6 wherein said triggering means is dimension and arranged such that the unlocking of said first locking means does not effect a locking state of the second locking means and the unlocking of the second locking means does not effect a locking state of said first locking means.

8. A device as recited in claim 6 wherein said handle member is fixed to one end of said cam plate.

9. A device as recited in claim 8 wherein said handle member has a base portion and two handle bar sections in a V-shaped arrangement with each handle bar section being angled off from a line bisecting the base portion.

10. A device as recited in claim 6 wherein said first locking means further comprises a first biasing device positioned on said shaft and in contact with said thrust plate for biasing said thrust plate into a locking state, and said second locking means includes a second biasing device having a first end in contact with said push plate and a second end in contact with said sliding plate so as to return said push plate to a neutral position between the first and second directions of rotation.

11. A device as recited in claim 10 wherein said cam plate includes a lateral slot through which said second biasing device extends intermediate of its first and second contact ends.

12. A device as recited in claim 6 further comprising a fixed base assembly which includes the sleeve member and which remains stationary while said sleeve portion swivels.

13. A device as recited in claim 12 further comprising said attachment unit which is secured to said sliding plate.

14. A device as recited in claim 13 wherein said attachment unit includes a chair seat.

15. A device as recited in claim 6 wherein said two laterally spaced sliding portions are two convex shaped side edge extensions in a facing arrangement, and said pair of laterally spaced sliding sections include two flange members having outer ends received in respective ones of said two convex shaped side edge extensions, and said device further comprising a friction reduction system which includes a friction reduction member selected from a group which includes bearing members and plastic insert members.

16. A sliding and swiveling device, comprising:
   a sliding plate which includes two laterally spaced sliding portions and two longitudinally extending reception slots positioned between said laterally spaced sliding portions;
   a cam plate rotatably supported in a first of said reception slots;
   a push plate rotatably supported in a second of said reception slots and said cam plate being position so as to come in contact with said push plate upon rotation of said cam plate;
   a holder which includes a pair of laterally spaced sliding sections which are in a sliding relationship with respect to the two sliding portions of said sliding plate, said holder having a first end which includes an engagement member which is engageable with said push plate so as to longitudinally lock said holder and sliding plate;
   a thrust member radially slideably supported by said holder and positioned such that said cam plate, upon rotation, contacts and shifts said thrust member, and said thrust member having a locking portion designed to extend into and out of engagement with respect to a sleeve member which is in a swivel relationship with said holder.

17. A device as recited in claim 16 further comprising a handle member secured to said cam plate.

18. A device as recited in claim 17 wherein said handle member is V-shaped.

19. A device as recited in claim 16 further comprising a first biasing device in contact with said holder and thrust member so as to bias said thrust member into a locking engagement with the sleeve member.

20. A device as recited in claim 19 further comprising a second biasing device in contact with said push plate and sliding plate to bias said push plate into a locking state.

21. A device as recited in claim 20 further comprising a support shaft supported by the first end of said holder and said first biasing device being in the form of a coil spring extending around the support shaft, and said second biasing device having a first end connected to said push plate, and a second end that is connected to said sliding plate and a portion between said ends extending through a slot formed in said cam plate.

22. A device as recited in claim 16 wherein said holder includes two flange sections at a first end thereof whose outer edges define said two laterally spaced sliding sections and a hollow sleeve portion extending off from the two flange sections and wherein said two laterally spaced sliding portions of said sliding plate are two convex shaped side edge extensions in a facing arrangement and the outer edges of said two flange extensions being received in respective ones of said two convex shaped side edge extensions, and said sliding plate further comprising a salient member which extends off from said sliding plate and has two outer walls and an intermediate wall which walls together define said reception slots.

23. A device as recited in claim 16 wherein said thrust member is in the form of a thrust plate that includes a tooth projection which aligns with the engagement member of said holder when the thrust plate is in a locked state and a cam receipt recess through which the cam plate extends.

24. A device as recited in claim 16 further comprising a base assembly which includes the sleeve member and is stationary with respect to the holder mounted for swivelling thereon, and an attachment unit secured to said sliding plate.

25. A device as recited in claim 24 wherein said attachment unit includes a chair seat.

26. A method of manufacturing a sliding and swiveling device, comprising:
   positioning a sliding plate which includes a surface for supporting an attachment unit, two laterally spaced sliding portions and two longitudinally extending reception slots positioned between said sliding portions;
   positioning a holder which includes a pair of laterally spaced sliding sections that include flange sections, said holder further comprising a sleeve portion which is dimensioned for receiving a sleeve member in a swivel relationship;
   inserting a cam plate within a first of said reception slots so that it is rotatable therein;
   inserting a push plate in a second of said reception slots so that it is rotatable therein and such that it comes in contact with said cam plate upon rotation of said cam plate in a first direction;
   inserting said flange sections of said holder into said two laterally spaced sliding portions;
   securing a thrust plate to said holder so that it is radially adjustable with respect to said holder for locking engagement with the sleeve member supporting said holder in a swivel relationship;
   securing a first biasing device to said push plate to bias said push plate into a longitudinal shift lock engagement with said holder; and
   positioning a second biasing device in contact with said thrust plate so as to bias said thrust plate into a swivel lock engagement with the sleeve member.

27. A sliding and swiveling device, comprising:

a sliding plate which includes a surface for supporting an attachment unit and two laterally spaced sliding portions;

a holder which includes a pair of laterally spaced sliding sections which are in a sliding relationship with respect to the two sliding portions of said sliding plate, said holder further comprising a sleeve portion which is dimensioned for receiving a sleeve member in a swivel relationship;

first locking means for releasably locking said sliding plate and holder against rotation with respect to the sleeve member;

second locking means for releasably locking said sliding plate and holder against relative longitudinal sliding;

a handle member;

means for triggering a release of said first locking means upon adjustment of said handle member in a first direction and for triggering a release of said second locking means upon adjustment of said handle member in a second direction, and wherein said handle member is pivotably supported by said triggering means and pivots about an axis that extends longitudinally in a common direction with longitudinal sliding of said plate upon release of said second locking means.

28. A device as recited in claim 27, wherein said handle member is centrally positioned between said sliding portions.

29. A device as recited in claim 28, wherein said triggering means includes a longitudinally extending cam member pivotably supported by said sliding plate, and said handle member is fixed to said cam member and pivots together with the cam member.

30. A device as recited in claim 27, wherein when said triggering means is activated so as to release said first locking means, said second locking means remains in a locking state and when said triggering means is activated so as to release said second locking means, said first locking means is in a locking state.

* * * * *